United States Patent
Broyde et al.

(10) Patent No.: US 8,125,240 B2
(45) Date of Patent: Feb. 28, 2012

(54) MULTICHANNEL INTERFACING DEVICE HAVING A BALANCING CIRCUIT

(75) Inventors: Frederic Broyde, Maule (FR); Evelyne Clavelier, Maule (FR)

(73) Assignee: Excem, Maule (FR)

( * ) Notice: Subject to any disclaimer, the term of this patent is extended or adjusted under 35 U.S.C. 154(b) by 0 days.

(21) Appl. No.: 12/970,244

(22) Filed: Dec. 16, 2010

(65) Prior Publication Data

US 2011/0084751 A1    Apr. 14, 2011

Related U.S. Application Data

(63) Continuation of application No. PCT/IB2009/051557, filed on Apr. 14, 2009.

(30) Foreign Application Priority Data

Jul. 11, 2008 (FR) ...................................... 08 03985

(51) Int. Cl.
*H03K 17/16* (2006.01)
*H03K 19/003* (2006.01)

(52) U.S. Cl. ............... 326/21; 326/30; 326/86; 375/220
(58) Field of Classification Search .............. 326/21–34, 326/82–87
See application file for complete search history.

(56) References Cited

U.S. PATENT DOCUMENTS 5,638,322 A * 6/1997 Lacey ........................ 365/185.2
(Continued)

OTHER PUBLICATIONS

F. Broydé and E. Clavelier, "A new pseudo-differential transmission scheme for on-chip and on-board interconnections", Proc. of the CEM 08 Int. Symp. on Electromagnetic Compatibility, Paris, May 2008, session C7. Available: http://www.eurexcem.com/bibliodef.htm.*

*Primary Examiner* — Shawki S Ismail
*Assistant Examiner* — Jany Tran
(74) *Attorney, Agent, or Firm* — Barnes & Thornburg LLP

(57) ABSTRACT

The invention relates to an interfacing device for transmission through interconnections used for sending a plurality of electrical signals.
The interfacing device of the invention comprises signal terminals and a common terminal. A transmitting circuit receives the input signals of the transmitting circuit coming from a source and delivers, when the transmitting circuit is in the activated state, currents to the signal terminals, each of the currents being mainly determined by one or more of the input signals of the transmitting circuit, one or more of the currents being not mainly determined by only one of the input signals of the transmitting circuit. The balancing circuit is such that, when the transmitting circuit is in the activated state, the current flowing out of the common terminal approximates the opposite of the sum of the currents flowing out of the signal terminals.

10 Claims, 8 Drawing Sheets

U.S. PATENT DOCUMENTS

| | | | | |
|---|---|---|---|---|
| 6,009,487 A * | 12/1999 | Davis et al. | ............... | 710/105 |
| 2006/0099926 A1 * | 5/2006 | Broyde et al. | ............... | 455/295 |
| 2006/0267633 A1 * | 11/2006 | King | ............... | 326/83 |
| 2007/0117446 A1 * | 5/2007 | Broyde et al. | ............... | 439/404 |
| 2010/0124295 A1 * | 5/2010 | Broyde et al. | ............... | 375/260 |
| 2010/0128814 A1 * | 5/2010 | Broyde et al. | ............... | 375/295 |
| 2010/0213971 A1 * | 8/2010 | Broyde et al. | ............... | 326/26 |
| 2010/0253446 A1 * | 10/2010 | Broyde et al. | ............... | 333/132 |
| 2011/0095838 A1 * | 4/2011 | Broyde et al. | ............... | 333/1 |
| 2011/0176558 A1 * | 7/2011 | Broyde et al. | ............... | 370/480 |

* cited by examiner

MULTICHANNEL INTERFACING DEVICE HAVING A BALANCING CIRCUIT

CROSS REFERENCE TO RELATED APPLICATIONS

This is a Continuation Application of PCT application PCT/IB2009/051557, filed 14 Apr. 2009, published in English under No. WO 2010/004448, which in turn claims priority to French patent application Ser. No. 08/03985 of 11 Jul. 2008, entitled "Dispositif d'interface multicanal avec circuit d'équilibrage", both of which are incorporated herein by reference.

FIELD OF THE INVENTION

The invention relates to an interfacing device for transmission through interconnections used for sending a plurality of electrical signals, such as the interconnections made with multiconductor cables, or with the traces of a printed circuit board, or inside an integrated circuit.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:

the binary signals used in binary signaling, that is to say any signal such that, in each transmission channel, the set of the values that this signal may take on has 2 elements;

the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits. Multilevel signals, for instance quaternary signals (sometimes referred to as PAM-4 or 4-PAM), are used to obtain high bit rates. We will consider that any signal which does not comply with this definition of a digital signal is an analog signal. Thus, the result of any type of modulation of a carrier by a digital signal will be regarded as an analog signal.

Said transmission may be obtained through an interconnection comprising m+1 conductors, among which m transmission conductors. A device for transmission in such an interconnection is shown in FIG. 1, this device comprising an interconnection (1) having m=4 transmission conductors (11) (12) (13) (14) and a reference conductor (7), that is to say a ground conductor. In FIG. 1, each end of the interconnection is connected to a termination circuit (4). The transmitting circuit (5) receives at its input the signals of the 4 channels of the source (2), and its 5 output terminals are connected to the conductors of the interconnection (1), one of these conductors being ground. The receiving circuit (6) has its 5 input terminals connected to the conductors of the interconnection (1), one of these conductors being ground. The device shown in FIG. 1 provides 4 transmission channels, such that the signals of the 4 channels of the source (2) are sent to the 4 channels of the destination (3). The device shown in FIG. 1 is somewhat general. For instance, according to the case, one and/or the other termination could comprise no component. For instance, according to the case, the transmitting circuit (5) and/or the receiving circuit (6) could comprise no component. However, devices differing from the one shown in FIG. 1 are also conceivable, for instance devices for transmission comprising several sources and/or several destinations, based on a data bus architecture.

The simplest transmission method for obtaining m transmission channels uses m single-ended links. Using m single-ended links, each transmission channel uses one transmission conductor of the interconnection, and the reference conductor (ground) is used for the return current produced by the currents flowing on the m transmission conductors. This scheme may be implemented according to FIG. 1. This method is subject to two detrimental phenomena: echo and crosstalk between the different transmission channels.

The prior art concerning transmission without echo and without crosstalk, applicable to this patent application, is set out in the 3 following patents:

the French patent number 0300064 of 6 Jan. 2003 entitled "Procédé et dispositif pour la transmission avec une faible diaphonie", corresponding to the international application number PCT/EP2003/015036 of 24 Dec. 2003 (WO 2004/062129), entitled "Method and device for transmission with reduced crosstalk";

the French patent number 0302814 of 6 Mar. 2003 entitled "Procédé et dispositif numériques pour la transmission avec une faible diaphonie", corresponding to the international application number PCT/EP2004/002382 of 18 Feb. 2004 (WO 2004/079941), entitled "Digital method and device for transmission with reduced crosstalk";

the French patent number 0303087 of 13 Mar. 2003 entitled "Procédé et dispositif pour la transmission sans diaphonie", corresponding to the international application number PCT/EP2004/002383 of 18 Feb. 2004 (WO 2004/082168), entitled "Method and device for transmission without crosstalk".

The inventions described in these three patents may be implemented according to FIG. 1. The article of F. Broydé and E. Clavelier entitled "A New Method for the Reduction of Crosstalk and Echo in Multiconductor Interconnections", published in the journal *IEEE Transactions on Circuits and Systems I*, vol. 52, No. 2, pages 405 to 416, in February 2005, corrected and supplemented by the article of F. Broydé and E. Clavelier entitled "Corrections to <<A New Method for the Reduction of Crosstalk and Echo in Multiconductor Interconnections>>", published in the journal *IEEE Transactions on Circuits and Systems I*, vol. 53, No. 8, p. 1851 in August 2006, proves that the inventions described in said French patents number 0300064, number 0302814 and number 0303087 and the corresponding international applications are indeed suitable for removing crosstalk between the different transmission channels obtained with said interconnection, and also for removing echo.

However, there are other crosstalk phenomena which may produce noise. Such phenomena are produced by some electromagnetic couplings between some conductors of said interconnection and other nearby conductors, for instance when said interconnection and these other conductors are built on the same printed circuit board. Such an "other nearby conductor" may for instance be a power supply conductor, a conductor of a link for digital signals, etc. We shall refer to these phenomena as "external crosstalk", for distinguishing them from crosstalk between said transmission channels, which shall be referred to as "internal crosstalk".

As explained in the prior art section of the French patent application Ser. No. 07/05260 of 20 Jul. 2007 entitled "Procédé et dispositif pour les transmissions pseudo-différentielles", corresponding to the international application number PCT/IB2008/052102 of 29 May 2008 (WO 2009/013644), entitled "Method and device for pseudo-differential transmission", a transmission scheme using the reference conductor, which is often called the ground conductor, as a return path for the return current produced by the currents flowing in the transmission conductors, often suffers from a strong coupling between said transmission channels and some other loops comprising a path in the reference conductor. This particular case of external crosstalk is sometimes called "ground noise" or "ground bounce".

If the interconnection is used for building m single-ended links, the reference conductor (ground) is used for the return current produced by the currents flowing on the m transmission conductors, as in the case shown in FIG. 1. This scheme is consequently vulnerable to external crosstalk (it is also subject to internal crosstalk). If the single-ended links are used for sending signals which contain frequencies for which the propagation phenomena in the interconnection are not negligible (for instance frequencies higher than the lowest propagation velocity in the interconnection divided by typically 15 times the length of the interconnection), it becomes necessary to use at least one termination circuit (4), as shown in FIG. 1, to reduce reflections. Such a termination circuit (4) is characterized, for the interconnection, by an impedance matrix with respect to ground, said impedance matrix with respect to ground being a diagonal matrix of size m×m. Section III of said paper entitled "A New Method for the Reduction of Crosstalk and Echo in Multiconductor Interconnections" explains that such a termination circuit cannot be matched, unless the transmission conductors are far apart and are hence uncoupled. It also explains that the detrimental effects of reflections may be minimized, if the diagonal components of said impedance matrix with respect to ground are pseudo-matched impedances minimizing a matrix norm of the matrix $P_G$ of the voltage reflection coefficients, with respect to the reference conductor, of the termination circuit. This provides a reduction of echo and, to a limited extent, a reduction of internal crosstalk. Unfortunately, such a termination circuit produces return currents flowing mainly in the reference conductor, a characteristic which conflicts with the reduction of external crosstalk.

If the interconnection is used according to one of the inventions described in said French patents number 0300064, number 0302814 and number 0303087 and the corresponding international applications, the reference conductor (ground) is also used for the return current produced by the currents flowing on the m transmission conductors, as shown in FIG. 1. These inventions, which are suitable for reducing or eliminating internal crosstalk, are therefore prone to external crosstalk. A termination circuit (4) used in these inventions must be matched to the (m+1)-conductor multiconductor transmission line used to model the interconnection. That is to say: the impedance matrix, with respect to ground, of the termination circuit must approximate the characteristic impedance matrix $Z_{GC}$, with respect to ground, of said (m+1)-conductor multiconductor transmission line ($Z_{GC}$ is a matrix of size m×m). Said paper entitled "A New Method for the Reduction of Crosstalk and Echo in Multiconductor Interconnections" shows that such a termination can be used to obtain a cancellation of echo and internal crosstalk. Unfortunately, such a termination circuit produces return currents flowing mainly in the reference conductor, a characteristic which conflicts with the reduction of external crosstalk.

However, there are transmission methods intended to provide a good protection against external crosstalk: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Carusone, K. Farzan and D. A. Johns entitled "Differential signaling with a reduced number of signal paths" published in *IEEE Transactions on Circuits and Systems II*, vol. 48, No. 3, pp. 294-300 in March 2001 and the section 4.2.3 of the book of F. Yuan entitled *CMOS current-mode circuits for data communications*, published by Springer in 2007).

A differential device for transmission providing m transmission channels uses an interconnection having n=2m transmission conductors. A pseudo-differential device for transmission providing m transmission channels uses an interconnection having n=m transmission conductors and a common conductor distinct from the reference conductor (ground). The common conductor is referred to as "return conductor" in the case of the pseudo-differential transmission scheme disclosed in said French patent application Ser. No. 07/05260 and the corresponding international application.

The French patent application Ser. No. 07/04421 of 21 Jun. 2007, entitled "Dispositif d'interface pseudo-différentiel avec circuit de terminaison", corresponding to the international application number PCT/IB2008/051826 of 8 May 2008 (WO 2008/155676), entitled "Pseudo-differential interfacing device having a termination circuit", describes termination circuits which do not produce return currents flowing mainly in the reference conductor or in a power supply conductor. Such termination circuits may be used in the pseudo-differential transmission scheme disclosed in said French patent application Ser. No. 07/05260 and the corresponding international application.

The method of said French patent application Ser. No. 07/05260 and the corresponding international application is very effective for the suppression of external crosstalk. However, it does not eliminate internal crosstalk. For instance, the article of F. Broydé and E. Clavelier entitled "A new pseudo-differential transmission scheme for on-chip and on-board interconnections" published in the proceedings of the "14$^{\grave{e}me}$ colloque international sur la compatibilité électromagnétique—CEM 08", which took place in Paris, France, in May 2008, shows that internal crosstalk may be present when this method is used.

Conversely, as explained above, the inventions described in said French patents number 0300064, number 0302814 and number 0303087 and the corresponding international applications are suitable for removing internal crosstalk and echo, but they do not reduce external crosstalk.

The French patent application Ser. No. 08/03876 of 8 Jul. 2008, entitled "Dispositif d'interface multicanal avec circuit de terminaison", corresponding to the international application number PCT/IB2009/051182 of 20 Mar. 2009, entitled "Multichannel interfacing device having a termination circuit", describes an interfacing device which may take the place of a receiving circuit and a termination circuit used in one of the devices described in said French patents number 0300064, number 0302814 and number 0303087 and the corresponding international applications, this interfacing device providing a reduction of external crosstalk at the level of the receiving circuit. However, this invention does not reduce the external crosstalk at the level of a transmitting circuit used in one of the devices described in said French patents number 0300064 and number 0302814 and the corresponding international applications.

DESCRIPTION OF THE INVENTION

It is an object of the interfacing device of the invention to provide transmission through an interconnection having two or more transmission conductors, the transmission presenting reduced external crosstalk and reduced internal crosstalk.

The invention is about a device for transmitting signals through a plurality of transmission channels, in a known frequency band, comprising:

m signal terminals, a common terminal and a reference terminal (ground), the signal terminals being intended to be connected to an interconnection having m transmission conductors, m being an integer greater than or equal to 2;

a transmitting circuit receiving q "input signals of the transmitting circuit" corresponding each to a transmission channel, q being an integer greater than or equal to 2 and less than or equal to m, the output of the transmitting circuit being coupled to each of said signal terminals, the output of the transmitting circuit delivering, when the transmitting circuit is in the activated state, m transmission variables, each of said transmission variables being either a voltage between one of said signal terminals and said common terminal or a current flowing out of one of said signal terminals, each of said transmission variables being mainly determined by one or more of said "input signals of the transmitting circuit", one or more of said transmission variables being not mainly determined by only one of said "input signals of the transmitting circuit"; and a balancing circuit delivering, when the transmitting circuit is in the activated state, a current into said common terminal, the total current flowing out of said common terminal being, when the transmitting circuit is in the activated state, in at least a part of said known frequency band, approximately equal to a sum of three terms, the first term being a constant current, the second term being the opposite of the sum of the currents flowing out of said signal terminals, and the third term being the current which would flow out of a passive two-terminal circuit element subject to the voltage between said common terminal and said reference terminal.

In a device of the invention, the common terminal is distinct from the reference terminal and from any terminal intended to present a fixed voltage with respect to the reference terminal (for instance a power supply terminal), in order to allow the operation of the balancing circuit as a controlled current source delivering a current into said common terminal. Thus, the common terminal is not connected to the reference terminal inside the device of the invention and the common terminal is not connected to a power supply terminal inside the device of the invention. However, this does not preclude a use of a device of the invention wherein the common terminal of a device of the invention is grounded (i.e. connected to the reference terminal) outside the device of the invention or connected to a power supply terminal outside the device of the invention, as explained below in the first embodiment.

In the following, the wordings "is in the deactivated state" and "is not in the activated state" are equivalent.

According to the invention, the transmitting circuit in the activated state delivers transmission variables, each of said transmission variables being mainly determined by one or more of said "input signals of the transmitting circuit", one or more of said transmission variables being not mainly determined by only one of said "input signals of the transmitting circuit". According to the invention, it is possible that there is a deactivated state of the transmitting circuit, in which the behavior of the transmitting circuit is different. However, the existence of a deactivated state of the transmitting circuit is not at all a characteristic of the invention.

According to the invention, the "input signals of the transmitting circuit" may be analog or digital signals.

According to the invention, each of said transmission variables is mainly determined by one or more of said "input signals of the transmitting circuit", one or more of said transmission variables being not mainly determined by only one of said "input signals of the transmitting circuit". This must be interpreted in a broad sense, as: each of said transmission variables is mainly determined, at each point in time, by the history, up to said point in time, of one or more of said "input signals of the transmitting circuit", one or more of said transmission variables being not mainly determined, at said point in time, by the history, up to said point in time, of only one of said "input signals of the transmitting circuit".

Consequently, a linear combination of elements $x_1, \ldots, x_r$, being a sum $\lambda_1 x_1 + \ldots + \lambda_r x_r$, where $\lambda_1, \ldots, \lambda_r$ are the coefficients of the linear combination, the specialist understands that, according to the invention, each transmission variable delivered by said transmitting circuit may be mainly determined by a linear combination of filtered "input signals of the transmitting circuit", one or more of said transmission variables being not mainly determined by only one of said filtered "input signals of the transmitting circuit", each of said filtered "input signals of the transmitting circuit" being the result of the application of linear filtering to one of said "input signals of the transmitting circuit".

Each of said filtered "input signals of the transmitting circuit" may be substantially equal to the corresponding input signal of the transmitting circuit. Consequently, according to the invention, each of said transmission variables delivered by said transmitting circuit may be mainly determined by a linear combination of said "input signals of the transmitting circuit", at least one of said linear combinations being such that two or more of the coefficients of said at least one of said linear combinations are not equal to zero.

The specialist understands that, according to the invention, each of said transmission variables delivered by said transmitting circuit may also be a linear combination of signals each mainly determined by one and only one of said "input signals of the transmitting circuit", at least one of said linear combinations being such that two or more of the coefficients of said at least one of said linear combinations are not equal to zero.

According to the invention, the wording "current which would flow out of a two-terminal circuit element subject to the voltage between said common terminal and said reference terminal" obviously refers to the most general "current flowing out of a two-terminal circuit element subject to the voltage between said common terminal and said reference terminal", that is to say a current which, at each point in time, is solely determined by the history, up to this point in time, of the voltage between said common terminal and said reference terminal. The specialist understands that this wording does not imply that a two-terminal circuit element subject to the voltage between said common terminal and said reference terminal is actually present in a device of the invention: the two-terminal circuit element is only used for modeling the current flowing out of said common terminal.

According to the invention, said two-terminal circuit element used for modeling the current flowing out of said common terminal is a passive two-terminal circuit element in the meaning of circuit theory (a passive circuit element is a circuit element in which the energy absorbed can only be positive or zero), but this two-terminal circuit element is not necessarily linear. Said third term may therefore be the current which would flow out of a non-linear passive two-terminal circuit element, for instance a diode. Conversely, said third term may be the current which would flow out of a linear passive two-terminal circuit element, for instance a resistor. Consequently, a device of the invention may be such that said total current flowing out of said common terminal approximates, when the transmitting circuit is in the activated state, in at least a part of said known frequency band, a sum of three terms, the first term being a constant current, the second term being the opposite of the sum of the currents flowing out of said signal terminals, and the third term being the current flowing out of a passive linear two-terminal circuit element subject to the voltage between said common terminal and said reference terminal.

According to the invention, the output of said transmitting circuit is coupled to the m signal terminals. The output of said transmitting circuit may also be coupled to said common terminal. Conversely, the output of said transmitting circuit may be not coupled to said common terminal.

The transmitting circuit and the balancing circuit used in a device of the invention may for instance only use analog signal processing to produce said transmission variables and the current delivered by the balancing circuit to the common terminal. The third, fifth, sixth and seventh embodiments described below are examples of this type of device of the invention. It is also possible that the transmitting circuit used in a device of the invention use digital signal processing to produce said transmission variables, while the balancing circuit only uses analog signal processing to produce the current delivered by the balancing circuit to the common terminal. The fourth embodiment described below is an example of this type of device of the invention.

However, the specialist understands that it is also conceivable that the balancing circuit used in a device of the invention uses digital signal processing to produce the current delivered by the balancing circuit to the common terminal.

Let us number said signal terminals from 1 to m. For any integer j greater than or equal to 1 and less than or equal to m, let us use $i_j$ to denote the current flowing out of the signal terminal number j. According to the invention, if we use $i_{C0}$ to denote said constant current of said first term, if we use $Y_D$ to denote the admittance, at a given frequency f in said part of said known frequency band, of said passive linear two-terminal circuit element subject to the voltage between said common terminal and said reference terminal, and if we use $v_C$ to denote the voltage between said common terminal and said reference terminal, the current $i_C$ flowing out of said common terminal is such that $$\text{if } f \neq 0 \ \ i_C \approx -\sum_{\alpha=1}^{m} i_\alpha - Y_D v_C \quad (1)$$

$$\text{and if } f = 0 \ \ i_C \approx i_{C0} - \sum_{\alpha=1}^{m} i_\alpha - Y_D v_C \quad (2)$$

The specialists understand how they can build a balancing circuit used in the interfacing device of the invention.

A device of the invention may comprise a receiving circuit delivering, when the receiving circuit is in the activated state, p "output signals of the receiving circuit" corresponding each to a transmission channel, p being an integer greater than or equal to 1 and less than or equal to m, the input of the receiving circuit being coupled to at least p of said signal terminals and to said common terminal, each of said "output signals of the receiving circuit" being mainly determined by one or more of the voltages between one of said signal terminals and said common terminal.

If the device of the invention comprises said receiving circuit, this receiving circuit delivers "output signals of the receiving circuit" corresponding each to a transmission channel, when the receiving circuit is in the activated state. According to the invention, it is possible that there is a deactivated state of the receiving circuit, in which the behavior or the receiving circuit is different. However, the existence of a deactivated state of the receiving circuit is not at all a characteristic of the invention.

For said receiving circuit, each of said "output signals of the receiving circuit" is mainly determined by one or more of the voltages between one of said signal terminals and said common terminal. This must be interpreted in a broad sense, as: each of said "output signals of the receiving circuit" is mainly determined, at each point in time, by the history, up to said point in time, of one or more of the voltages between one of said signal terminals and said common terminal. Consequently, the specialist understands that, according to the invention, each of said "output signals of the receiving circuit" may be mainly determined by a linear combination of "filtered voltages between one of said signal terminals and said common terminal", each of said "filtered voltages between one of said signal terminals and said common terminal" being the result of the application of linear filtering to one of the voltages between one of said signal terminals and said common terminal.

Each of said "filtered voltages between one of said signal terminals and said common terminal" may be substantially equal to the corresponding voltage between one of said signal terminals and said common terminal. Consequently, according to the invention, each of said "output signals of the receiving circuit" may be mainly determined by a linear combination of the voltages between one of said signal terminals and said common terminal.

A device of the invention may be such that said balancing circuit, said transmitting circuit and said receiving circuit (if the device of the invention comprises a receiving circuit) are without any part in common to any two of them. Consequently, a device of the invention may be such that said balancing circuit has no part in common with said transmitting circuit. Conversely, an interfacing device of the invention may be such that said balancing circuit, said transmitting circuit and said receiving circuit (if the device of the invention comprises a receiving circuit) are not without any part in common to any two of them. This possibility will be discussed below in the presentation of the fourth embodiment. In particular, a device of the invention may be such that said balancing circuit has at least one part in common with said transmitting circuit.

Even in the case of a device of the invention in which said balancing circuit, said transmitting circuit and said receiving circuit (if the device of the invention comprises a receiving circuit) are not without any part in common to any two of them, the specialist understands that the functions of the balancing circuit, of the transmitting circuit and of the receiving circuit (if the device of the invention comprises a receiving circuit) are distinct. The definition of a device of the invention, this definition being based on the presence of a balancing circuit, of a transmitting circuit and possibly of a receiving circuit, must therefore be understood as a definition relating to functions.

Said interconnection having m transmission conductors may be realized using a cable. Said interconnection may also be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

The explanations which will be provided below for the embodiments show that a device of the invention may be such that it does not comprise a transformer. This characteristic is essential for realizing a device of the invention inside an integrated circuit. A device of the invention may be such that it constitutes a part of an integrated circuit, said interconnection being realized inside said integrated circuit. In this case, it is possible that said m signal terminals and/or said common terminal are not coupled to pins of said integrated circuit.

A device of the invention may be such that it constitutes a part of an integrated circuit, each of said m signal terminals being coupled to one or more pins of said integrated circuit, said common terminal being coupled to one or more pins of said integrated circuit. This configuration is appropriate when said interconnection is realized outside said integrated circuit. The specialist notes that if there are many signal terminals, for instance more than 16 signal terminals, the absolute value of the current which may flow through the common terminal may become much larger than the maximum absolute value of the current flowing through a single signal terminal. Consequently, in this case, if a single pin is allocated to the common terminal, a degradation of transmission may occur for fast signals, because of the inductance of a connection using a single pin. In this case, using several pins for the common terminal reduces this inductance and improves transmission.

A device of the invention may comprise a termination circuit such as one of the termination circuits described in said French patent application Ser. No. 08/03876 and the corresponding international application. Consequently, a device of the invention may comprise a termination circuit coupled to each of said signal terminals and to said common terminal, the termination circuit being, when the termination circuit is in the activated state, approximately equivalent, for said signal terminals and said common terminal, to a (m+1)-terminal network such that, at least one quiescent operating point, for small signals in said part of said known frequency band, the impedance matrix, with respect to said common terminal, of said (m+1)-terminal network is equal to a wanted matrix of size m×m. Said wanted matrix of size m×m may be a non-diagonal matrix.

In this definition of a termination circuit, it is possible that said (m+1)-terminal network may be considered as linear. Consequently, according to the invention, said termination circuit in the activated state may, for said signal terminals and said common terminal, be approximately equivalent, to a linear (m+1)-terminal network such that, in said part of said known frequency band, the impedance matrix, with respect to said common terminal, of said linear (m+1)-terminal network is equal to a wanted non-diagonal matrix of size m×m. According to the invention, it is possible that there is a deactivated state of the termination circuit, in which the behavior of the termination circuit is different from the one defined above. However, the existence of a deactivated state of the termination circuit is not at all a characteristic of the invention.

An interfacing device of the invention may be such that said termination circuit is made of a network of resistors, m of said resistors being connected between one of said signal terminals and said common terminal, one or more of said resistors being connected between two of said signal terminals.

A termination circuit made of a network of resistors is however not at all a characteristic of the invention. By way of a first example, designers may, in order to reduce the power consumed by the termination circuit, choose to allow the termination circuit to be effective only in a relevant interval of frequencies, for instance by including suitable reactive circuit elements in the termination circuit. By way of a second example, the termination circuit could include active components, for instance insulated gate field-effect transistors (MOSFETs) operating in the ohmic regime. The impedance of the channel of such components may be adjustable by electrical means. Consequently, said termination circuit may be such that the impedance matrix, with respect to said common terminal, of said termination circuit in the activated state can be adjusted by electrical means.

In a similar way, said balancing circuit may be such that the admittance $Y_D$ of said passive linear two-terminal circuit element subject to the voltage between said common terminal and said reference terminal can be adjusted by electrical means.

In the case where the termination circuit has an activated state and a deactivated state, the impedance of the channel of one or more MOSFETs may for instance be controlled by one or more control signals taking on different values in the activated state and in the deactivated state. Consequently, said termination circuit may be such that said termination circuit has an activated state and a deactivated state, the impedance matrix, with respect to said common terminal, of said termination circuit in the activated state being different from the impedance matrix, with respect to said common terminal, of said termination circuit in the deactivated state.

In the case where the termination circuit has an activated state and a deactivated state, components such as transistors may for instance be used as switches having a closed state and an open state. In this case, said transistors may for instance be in the closed state when the termination circuit is in the activated state, and be in the open state when the termination circuit is in the deactivated state. Consequently, said termination circuit may be such that said termination circuit has an activated state and a deactivated state, each current flowing from said termination circuit to one of said signal terminals being substantially zero when said termination circuit is in the deactivated state. Designers may, in order to reduce the power consumed by the termination circuit, choose to put such a termination circuit in the deactivated state when the transmitting circuit is in the activated state.

An interfacing device of the invention may be such that said termination circuit has no part in common with said balancing circuit and/or with said transmitting circuit and/or, if the device of the invention comprises a receiving circuit, with said receiving circuit. Conversely, an interfacing device of the invention may be such that said termination circuit has one or more parts in common with said balancing circuit and/or with said transmitting circuit and/or, if the device of the invention comprises a receiving circuit, with said receiving circuit.

According to the invention, the number in of signal terminals may be equal to the number q of "input signals of the transmitting circuit".

If the device of the invention comprises said receiving circuit, the number m of signal terminals may be equal to the number p of "output signals of the receiving circuit". In particular, an interfacing device of the invention may be such that m is greater than or equal to three.

According to the invention, the "input signals of the transmitting circuit" may for instance be applied to the transmitting circuit using q single-ended links. According to the invention, the q "input signals of the transmitting circuit" may for instance be applied to the transmitting circuit using q differential links. According to the invention, the p "output signals of the receiving circuit" may for instance be delivered using p single-ended links. According to the invention, the p "output signals of the receiving circuit" may for instance be delivered using p differential links.

According to the invention, the transmitting circuit and/or the receiving circuit may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as distortions caused by propagation. The reduction of these distortions may be obtained, in a device of the invention, using an equalization reducing the effects of the distortions caused by propagation, said equalization being implemented in said transmitting circuit and/or in said receiving circuit. This type of processing, which is also sometimes referred to as compensation, is well known to specialists, and may be implemented using analog signal processing or digital signal processing. Specialists know that it is commonplace to use adaptive algorithms for implementing this type of processing in receivers for data transmission. A device of the invention may use an adaptive equalization. This type of processing is well known to specialists, and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment (Best Mode)

Figure 1:
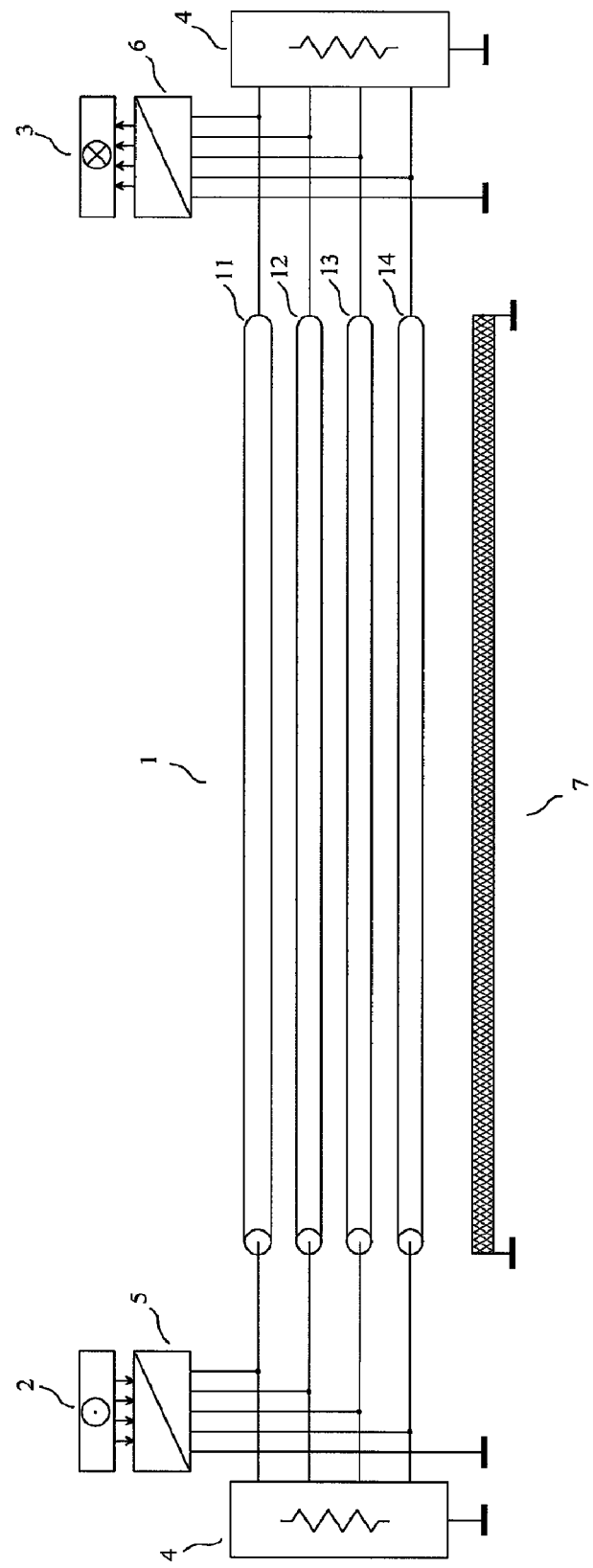
FIG. 1 shows a system for transmission comprising an interconnection having four transmission conductors, and has already been discussed in the section dedicated to the presentation of prior art.
Figure 2:
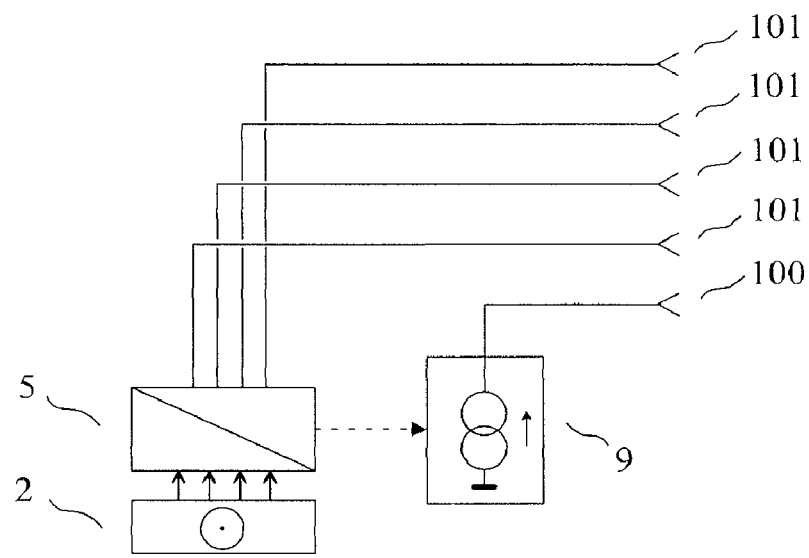
FIG. 2 shows a first embodiment of the invention.

As a first embodiment of an interfacing device of the invention, given by way of non-limiting example and best mode of carrying out the invention, we have represented in FIG. 2 an interfacing device of the invention built inside an integrated circuit, comprising m=4 signal terminals (101) and a common terminal (100), the signal terminals (101) and the common terminal (100) being intended to be connected to an interconnection having m=4 transmission conductors.

A transmitting circuit (5) receives q=4 "input signals of the transmitting circuit" coming from a source (2), the output of the transmitting circuit being coupled to the q=4 signal terminals (101). The output of the transmitting circuit (5) delivers, when the transmitting circuit is in the activated state, q=4 transmission variables, each transmission variable being a current flowing out of one of said signal terminals (101), each transmission variable being mainly determined by a linear combination of said "input signals of the transmitting circuit", at least one of said linear combinations being such that two or more of the coefficients of said at least one of said linear combinations are not equal to zero. When the transmitting circuit (5) is not in the activated state, its output presents a high impedance, so that the transmitting circuit (5) does not produce transmission variables and only causes a negligible current through the signal terminals (101) and the common terminal (100).

The specialists know several suitable methods for producing a high impedance state at the output of the transmitting circuit (5). The possibility of controlling the activated state of a transmitting circuit is usually used in data bus architectures. We note that the circuits needed to control the activated state of the transmitting circuit (5) at a given point in time are not shown in FIG. 2. We also note that the address and/or control lines necessary for coordinating the activated state of the transmitting circuit (5) with the operation of the other entities connected to such a bus are not shown in FIG. 2.

The balancing circuit (9) is such that, when the transmitting circuit is in the activated state, the current $i_C$ flowing out of the common terminal (100) approximates the sum of three terms, the first term being a constant current $i_{C0}$, the second term being the opposite $-(i_1+i_2+i_3+i_4)$ of the sum of the currents $i_1$, $i_2$, $i_3$ and $i_4$ flowing out of the signal terminals (101) and the third term being the current flowing out of a passive linear two-terminal circuit element subject to the voltage between the common terminal and a reference node of the integrated circuit. In the case where the voltage $v_C$ between the common terminal and said reference node is sinusoidal, the third term is the current $-v_C Y_D$ which would flow out of the passive linear two-terminal circuit element of admittance $Y_D$. Here, we find again the equations (1) and (2).

Figure 3:
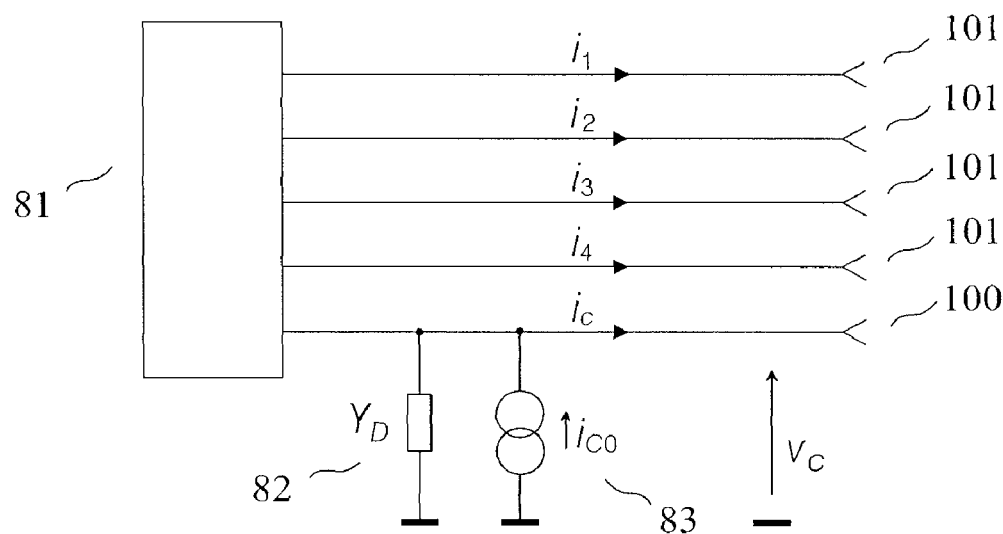
FIG. 3 shows an equivalent network for the signal terminals and the common terminal in the first embodiment.

An interconnection coupled to the signal terminals (101) and to the common terminal (100) sees a circuit element having m+2=6 terminals if we include the reference terminal (ground). The FIG. 3 shows an equivalent network of the circuit element having m+2 terminals seen by the interconnection when the transmitting circuit is in the activated state, in an ideal implementation. The specialists understand that such an equivalent network is only suitable for determining the voltages between these m+2 terminals and the currents flowing out of these terminals. In FIG. 3, we find an isolated circuit (81) having exactly m+1 terminals, a passive linear two-terminal circuit element (82) of admittance $Y_D$ and a current source (83) delivering the constant current $i_{C0}$. The isolated circuit (81) is not necessarily linear. The admittance of the passive linear two-terminal circuit element (82) may be frequency-dependent. The isolated circuit (81) having exactly m+1 terminals, the current flowing out of its terminal connected to the common terminal (100) is exactly $-(i_1+i_2+i_3+i_4)$. Consequently, the circuit shown in FIG. 3 complies with the equations (1) and (2). We note that the current source (83) of FIG. 3 does not correspond to the balancing circuit (9) of FIG. 2: the current source (83) of FIG. 3 is only a circuit element of the equivalent schematic diagram of the circuit element having m+2 terminals seen by the interconnection, in an ideal implementation.

The specialist understands that, in a real implementation, it is possible that the current flowing out of the common terminal (100) does not exactly correspond to said sum of three terms. Consequently, the equivalent schematic diagram of FIG. 3 is only an approximation.

The specialist understands how he may, using prior techniques, design a transmitting circuit (5) delivering transmission variables when the transmitting circuit is in the activated state, each transmission variable being a current flowing out of one of said signal terminals (101), each transmission variable being mainly determined by a linear combination of said "input signals of the transmitting circuit", at least one of said linear combinations being such that two or more of the coefficients of said at least one of said linear combinations are not equal to zero. Examples of transmitting circuits suitable for delivering such transmission variables will be given in the presentations of the fourth, fifth, sixth and seventh embodiments.

Figure 4:
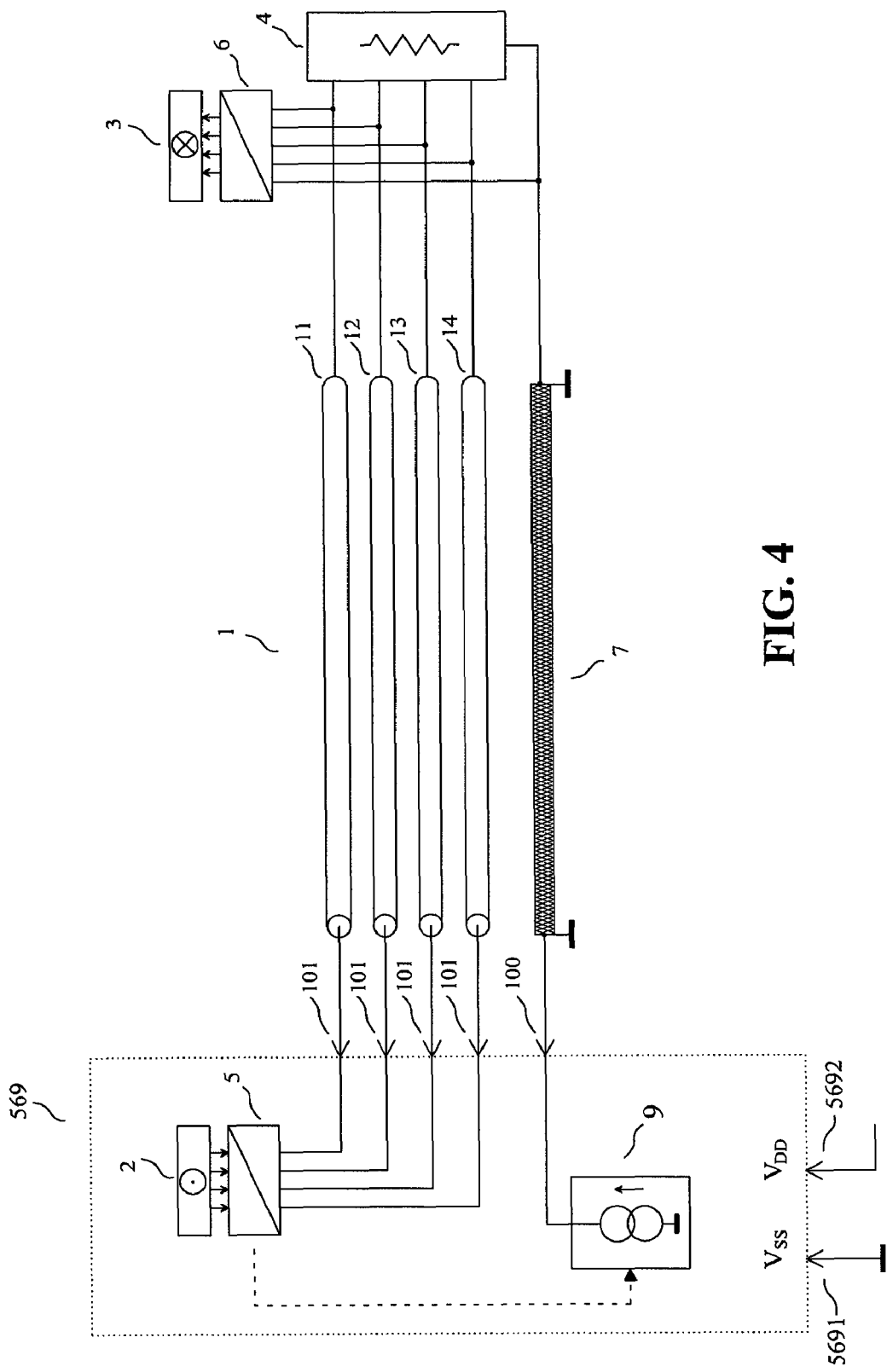
FIG. 4 shows a use of the first embodiment.

FIG. 4 shows a use of a device of the invention, this use involving an interconnection (1) having m=4 transmission conductors (11) (12) (13) (14) and a reference conductor (7), that is to say a ground conductor. All items shown in FIG. 4 belong to the same printed circuit assembly and the reference conductor (7) is a ground plane of the printed circuit board of this printed circuit assembly. Said transmission conductors (11) (12) (13) (14) are traces built in the printed circuit board. As said above, the interfacing device of the invention comprising the transmitting circuit (5) and the balancing circuit (9) is built inside an integrated circuit (569) which also comprises the source (2). The integrated circuit (569) is power supplied via one or more pins (5691) connected to said ground plane and one or more pins (5692) connected to a power plane of the printed circuit board.

The common terminal node of the balancing circuit (9) of the device of the invention is not grounded inside said integrated circuit (569). Thus, the common terminal (100) of the device of the invention is not grounded inside the device of the invention. The signal terminals (101) of the device of the invention are connected to the transmission conductors (11) (12)(13) (14) of the interconnection (1) and the common terminal (100) of the device of the invention is connected to said reference conductor (7). Thus, the common terminal (100) of the device of the invention is grounded outside the device of the invention.

In FIG. 4, a termination circuit (4) and a receiving circuit (6) are placed at the far-end of the interconnection. This termination circuit (4) and this receiving circuit (6) are not part of the device of the invention. The 5 terminals of the termination circuit (4) and the 5 input terminals of the receiving circuit (6) are connected to the conductors of the interconnection (1), one of these conductors being ground. The use shown in FIG. 4 provides 4 transmission channels, the signals of the 4 channels of the source (2) being sent to the 4 channels of the destination (3) connected to the receiving circuit (6).

In FIG. 4, the receiving circuit (6) and the termination circuit (4) are designed as explained in said French patent number 0300064, the corresponding international application and said article entitled "A New Method for the Reduction of Crosstalk and Echo in Multiconductor Interconnections". The transmitting circuit (5) combines the "input signals of the transmitting circuit" according to linear combinations defined by a transition matrix from modal electrical variables to natural electrical variables, in order to obtain, at the output of said transmitting circuit (5), the generation of modal electrical variables, each of said modal electrical variables being proportional to one and only one of said "input signals of the transmitting circuit". The specialist understands that said natural electrical variables and said modal electrical variables relate to a (m+1)-conductor multiconductor transmission line used to model the interconnection (1).

In FIG. 4, the transmission variables associated with the generation of modal electrical variables are currents flowing out of the signal terminals (101). If the prior art transmission scheme described in said French patent number 0300064, the corresponding international application and said article entitled "A New Method for the Reduction of Crosstalk and Echo in Multiconductor Interconnections" had been directly used, the return current produced by the currents flowing out of the signal terminals (101) would have flown from the reference conductor (7) to the internal ground conductors of said integrated circuit (569), via said one or more pins (5691) connected to said ground plane. Consequently, the operation of the transmitting circuits (5) would have produced external crosstalk, since the variations of the return current flowing in said one or more pins (5691) connected to said ground plane would have induced noise voltages in other circuits of said integrated circuit (569). The specialist understands that the device of the invention provides a protection against this cause of external crosstalk, because the return current produced by the currents flowing out of the signal terminals (101) flows in the connection between the common terminal (100) and the reference conductor (7) and does not use said one or more pins (5691) connected to said ground plane.

Thus, the use shown in FIG. 4 provides a reduction of external crosstalk, in addition to the reduction of internal crosstalk and echo inherent to the invention described in said French patent number 0300064 and the corresponding international application.

Second Embodiment

Figure 5:
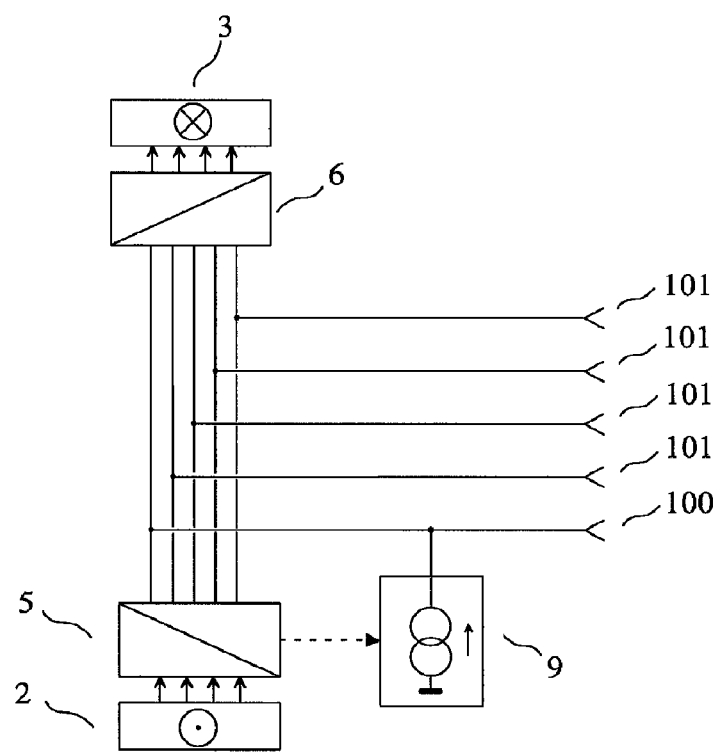
FIG. 5 shows a second embodiment of the invention.

As a second embodiment of an interfacing device of the invention, given by way of non-limiting example, we have represented in FIG. 5 an interfacing device of the invention built inside an integrated circuit, comprising m=4 signal terminals (101) and a common terminal (100), the signal terminals (101) and the common terminal (100) being intended to be connected to an interconnection having m=4 transmission conductors.

A transmitting circuit (5) receives q=4 "input signals of the transmitting circuit" coming from a source (2), the output of the transmitting circuit being coupled to the q=4 signal terminals (101) and to the common terminal (100). The output of the transmitting circuit (5) delivers, when the transmitting circuit is in the activated state, q=4 transmission variables, each transmission variable being a voltage between one of said signal terminals (101) and said common terminal (100), each transmission variable being mainly determined by a linear combination of said "input signals of the transmitting circuit", at least one of said linear combinations being such that two or more of the coefficients of said at least one of said linear combinations are not equal to zero. When the transmitting circuit (5) is not in the activated state, its output presents a high impedance, so that the transmitting circuit (5) does not produce transmission variables and only causes a negligible current through the signal terminals (101) and the common terminal (100).

A receiving circuit (6) delivers, when the receiving circuit is in the activated state, p=4 "output signals of the receiving circuit" corresponding each to a transmission channel, the input of the receiving circuit being coupled to the 4 signal terminals (101) and to the common terminal (100), each of the "output signals of the receiving circuit" being determined by a linear combination of the voltages between one of said signal terminals (101) and said common terminal (100). The "output signals of the receiving circuit" are delivered to the destination (3). When the receiving circuit (6) is not in the activated state, its output presents a high impedance, so that the receiving circuit (6) does not deliver any "output signal of the receiving circuit".

The specialists know several suitable methods for producing a high impedance state at the output of the transmitting circuit (5) and at the output of the receiving circuit (6). The possibility of controlling the activated state of a transmitting circuit and/or of a receiving circuit is usually used in data bus architectures. We note that the circuits needed to control the activated state of the transmitting circuit (5) and of the receiving circuit (6) at a given point in time are not shown in FIG. 5. We also note that the address and/or control lines necessary for coordinating the activated state of the transmitting circuit (5) and of the receiving circuit (6) with the operation of the other entities connected to such a bus are not shown in FIG. 5.

The balancing circuit (9) is such that, when the transmitting circuit is in the activated state, the current $i_C$ flowing out of the common terminal (100) approximates the sum of three terms, the first term being a constant current $i_{C0}$, the second term being the opposite $-(i_1+i_2+i_3+i_4)$ of the sum of the currents $i_1$, $i_2$, $i_3$ and $i_4$ flowing out of the signal terminals (101) and the third term being the current which would flow out of a passive linear two-terminal circuit element subject to the voltage between the common terminal and a reference node of the integrated circuit.

An interconnection coupled to the signal terminals (101) and to the common terminal (100) sees a circuit element having m+2=6 terminals if we include the reference terminal (ground), and the equivalent network of FIG. 3 is also applicable to this second embodiment: it shows the circuit element having m+2 terminals seen by the interconnection when the transmitting circuit is in the activated state, in an ideal implementation. Here also, the equivalent schematic diagram of FIG. 3 is only an approximation.

The specialist understands how he may, using prior techniques, design a transmitting circuit (5) delivering transmission variables when the transmitting circuit is in the activated state, each transmission variable being a voltage between one of said signal terminals (101) and said common terminal (100), each transmission variable being mainly determined by a linear combination of said "input signals of the transmitting circuit", at least one of said linear combinations being such that two or more of the coefficients of said at least one of said linear combinations are not equal to zero. An example of a transmitting circuit suitable for delivering such transmission variables will be given in the presentation of the third embodiment.

The specialist understands that a prior art receiver for pseudo-differential signals may be used as a receiving circuit (6) delivering "output signals of the receiving circuit" when the receiving circuit is in the activated state, each of the "output signals of the receiving circuit" being determined by a linear combination of the voltages between one of said signal terminals (101) and said common terminal (100). For instance, the receiving circuit (6) may be similar to one of the receiving circuits described in the French patent application Ser. No. 08/03830 of 7 Jul. 2008, entitled "Circuit de réception pseudo-différentiel" corresponding to the international application number PCT/IB2009/051053 of 13 Mar. 2009, entitled "Pseudo-differential receiving circuit".

Third Embodiment

Figure 6:
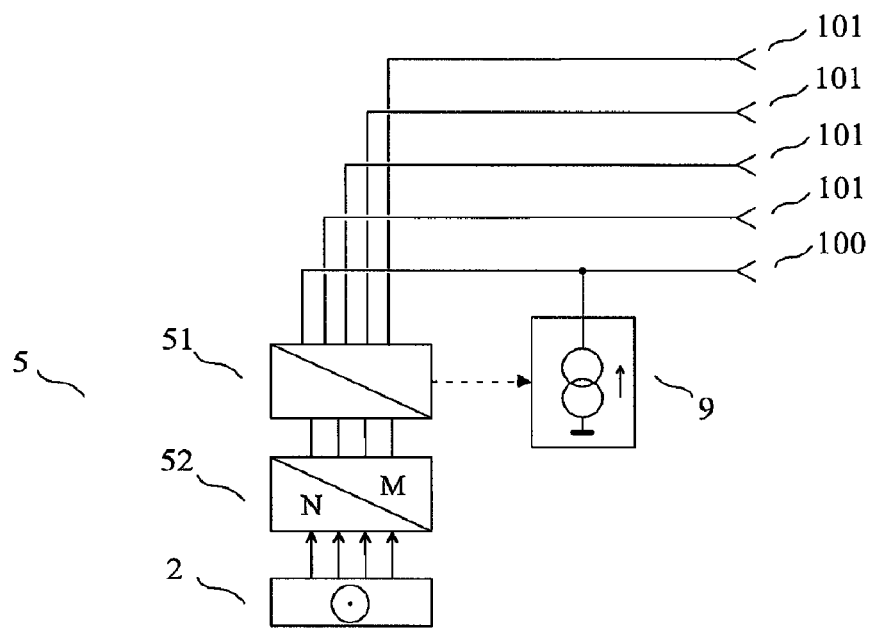
FIG. 6 shows a third embodiment of the invention.

As a third embodiment of an interfacing device of the invention, given by way of non-limiting example, we have represented in FIG. 6 an interfacing device of the invention comprising m=4 signal terminals (101) and a common terminal (100), the signal terminals (101) and the common terminal (100) being intended to be connected to an interconnection having m=4 transmission conductors.

A transmitting circuit (5) comprises a line driver (51) and a multiple-input and multiple-output amplifier (52). The transmitting circuit (5) receives q=4 "input signals of the transmitting circuit" coming from a source (2), the output of the transmitting circuit being coupled to the 4 signal terminals (101) and to the common terminal (100). Said multiple-input and multiple-output amplifier (52) has q inputs and m outputs, and each of the m inputs of the line driver (51) is connected to one of the m outputs of said multiple-input and multiple-output amplifier (52).

The line driver (51) and the balancing circuit (9) form an interfacing device described in French patent application Ser. No. 07/04889 of 6 Jul. 2007 entitled "Dispositif d'interface pseudo-différentiel avec circuit d'équilibrage", corresponding to the international application number PCT/IB2008/051942 of 16 May 2008 (WO 2009/007864), entitled "Pseudo-differential interfacing device having a balancing circuit" which delivers, when in the activated state, m=4 transmission variables, each transmission variable being a voltage between one of said signal terminals (101) and said common terminal (100), each transmission variable being mainly determined by one and only one of the output signals of said multiple-input and multiple-output amplifier (52).

Each output signal of the multiple-input and multiple-output amplifier (52) is mainly determined by a linear combination of said "input signals of the transmitting circuit", at least one of said linear combinations being such that two or more of the coefficients of said at least one of said linear combinations are not equal to zero. For instance, said multiple-input and multiple-output amplifier (52) may be similar to one of the transmitting circuits described in said French patent number 0300064 and the corresponding international application, for instance one of the transmitting circuits shown in FIG. 7 or FIG. 9 of said French patent number 0300064 and the corresponding international application. For instance, said multiple-input and multiple-output amplifier (52) may be similar to the multiple-input and multiple-output amplifier described in French patent application number 06/00388 of 17 Jan. 2006 entitled "Amplificateur à entrées multiples et sorties multiples" and in the corresponding international application number PCT/IB2006/003950 of 19 Dec. 2006 (WO 2007/083191), entitled "multiple-input and multiple-output amplifier".

If said multiple-input and multiple-output amplifier receives voltages at its inputs and delivers voltages at its outputs, it is characterized by a gain matrix, and the specialist understands that such a gain matrix may be adjustable by electrical means. If said multiple-input and multiple-output amplifier receives voltages at its inputs and delivers currents at its outputs, it is characterized by a transfer admittance matrix, and the specialist understands that such a transfer admittance matrix may be adjustable by electrical means. Consequently, according to the invention, said transmitting circuit may be such that one or more of said coefficients of said linear combinations can be adjusted by electrical means.

The specialist understands that:

a) the output of the transmitting circuit (5) shown in FIG. 6 delivers, when the transmitting circuit is in the activated state, m=4 transmission variables, each transmission variable being a voltage between one of said signal terminals (101) and said common terminal (100), each transmission variable being mainly determined by a linear combination of said "input signals of the transmitting circuit", at least one of said linear combinations being such that two or more of the coefficients of said at least one of said linear combinations are not equal to zero;

b) the balancing circuit (9) shown in FIG. 6 is such that, when the transmitting circuit is in the activated state, the current $i_C$ flowing out of the common terminal (100) approximates the sum of three terms, the first term being a constant current $i_{C0}$, the second term being the opposite $-(i_1+i_2++i_4)$ of the sum of the currents $i_2$, $i_3$ and $i_4$ flowing out of the signal terminals (101) and the third term being the current flowing out of a passive linear two-terminal circuit element subject to the voltage between the common terminal and a reference node.

This third embodiment is appropriate for analog signals and digital signals. The device of the invention may use direct current (dc) coupling with the interconnection. This is for instance the case if the line driver (51) and the balancing circuit (9) form an interfacing device similar to the one described in the sixth or the seventh embodiments of said French patent application Ser. No. 07/04889 and the corresponding international application. The device of the invention may use alternating (ac) coupling with the interconnection. This is for instance the case if the line driver (51) and the balancing circuit (9) form an interfacing device similar to the one described in the eighth embodiment of said French patent application Ser. No. 07/04889 and the corresponding international application.

Fourth Embodiment

Figure 7:
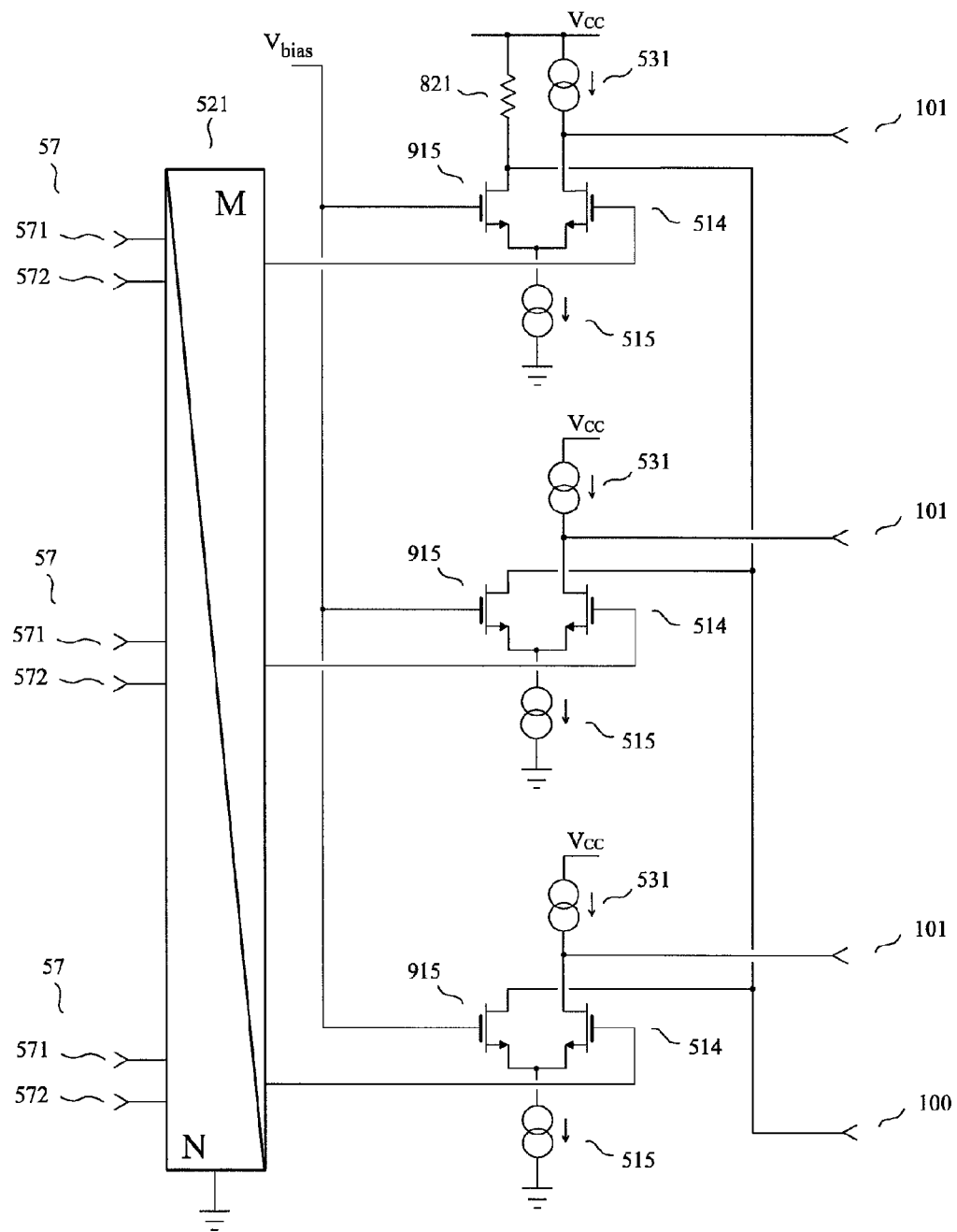
FIG. 7 shows a transmitting circuit and a balancing circuit used in a fourth embodiment of the invention.

A fourth embodiment of an interfacing device of the invention, given by way of non-limiting example, comprises the transmitting circuit and the balancing circuit shown in FIG. 7, in which:

each of the q=3 "input signals of the transmitting circuit" is applied to an input (57) which is a differential input comprising two terminals (571) (572);

each of the q=3 inputs (57) is connected to an input of a multiple-input and multiple-output digital signal processing device (521) having q inputs and m outputs;

each of the m=3 outputs of said multiple-input and multiple-output digital signal processing device (521) corresponds to an input of a differential pair made of two n-channel transistors (514) (915) whose sources are biased by a current source (515) supplying a practically constant current I;

each of the m=3 signal terminals (101) is connected to the drain of the first transistor (514) of one of said differential pairs and to a current source (531) supplying a current approximating I/2 and practically constant;

the common terminal (100) is connected to the drains of the m second transistors (915) of said differential pairs and to a resistor (821) connected to a positive power supply terminal.

The specialist understands that the current sources (515) (531) shown in FIG. 7 are ideal circuit elements which may be realized with real components, for instance using current mirrors. The specialist understands that it is easy to realize a circuit controlling the parameter I determining the current delivered by the current sources (515) (531), and that an "enable" control signal may set this parameter to a value near zero. In this case, the transmitting circuit shown in FIG. 7 is not in the activated state and its output presents a high impedance.

Let us note that each of the current sources (515) supplying a practically constant current I has a terminal connected to ground, the ground symbol used in FIG. 7 and in the following figures having exactly the same meaning as the other ground symbol used in the FIGS. 1 to 6.

Each output signal of the multiple-input and multiple-output digital signal processing device (521) is mainly determined by a linear combination of said "input signals of the transmitting circuit", at least one of said linear combinations being such that two or more of the coefficients of said at least one of said linear combinations are not equal to zero. For instance, said multiple-input and multiple-output digital signal processing device (521) may be similar to one of the transmitting circuits described in said French patent number 0302814 and the corresponding international application, for instance the transmitting circuit shown in FIG. 2 of said French patent number 0302814 and the corresponding international application in the case where the "input signals of the transmitting circuit" are digital signals, or the transmitting circuit shown in FIG. 4 of said French patent number 0302814 and the corresponding international application in the case where the "input signals of the transmitting circuit" are analog signals.

In FIG. 7, we consider that the balancing circuit is made of the q second transistors (915) of said differential pairs and of the resistor (821) connected to a power supply terminal, the transmitting circuit being composed of the other components shown in FIG. 7. Consequently, the specialist understands that:

a) the output of the transmitting circuit shown in FIG. 7 delivers, when the transmitting circuit is in the activated state, m=3 transmission variables, each transmission variable being a current flowing out of one of said signal terminals (101), each transmission variable being mainly determined by a linear combination of said "input signals of the transmitting circuit", at least one of said linear combinations being such that two or more of the coefficients of said at least one of said linear combinations are not equal to zero;

b) the balancing circuit shown in FIG. 7 is such that, when the transmitting circuit is in the activated state, the current $i_C$ flowing out of the common terminal (100) approximates the sum of three terms, the first term being a constant current $i_{C0}$, the second term being the opposite $-(i_1+i_2+i_3)$ of the sum of the currents $i_1$, $i_2$ and $i_3$ flowing out of the signal terminals (101) and the third term being the current flowing out of a passive linear two-terminal circuit element subject to the voltage between the common terminal and a reference node.

More precisely, the specialist sees that, for a suitable biasing of the signal terminals (101) and of the common terminal (100), the circuits shown in FIG. 7 are such that the currents flowing out of the m signal terminals (101) and the common terminal (100) satisfy $$i_C \approx -\frac{qI}{2} - \sum_{\alpha=1}^{m} i_\alpha + \frac{V_{CC} - v_C}{R_D} \qquad (3)$$

where $V_{CC}$ is the voltage between said power supply terminal and the reference terminal and where $R_D$ is the resistance of the resistor (821). This equation is frequency-independent and is compatible with the equations (1) and (2), for $$i_{C0} \approx \frac{V_{CC}}{R_D} - \frac{qI}{2} \tag{4}$$

and for $Y_D=1/R_D$.

It is possible to consider that the circuits shown in FIG. 7 consist of a multiple-input and multiple-output digital signal processing device (521) and an interfacing device described in said French patent application Ser. No. 07/04889 and the corresponding international application, said interfacing device being similar to one of the pseudo-differential transmitting circuits discussed in the paper of F. Broydé and G. Broydé entitled "Two pseudo-differential transmitting circuits producing a constant common-mode current", published in the Proceedings of the 2008 *IEEE International Midwest Symposium on Circuits and Systems* (*MWSCAS*), Aug. 10-13, 2008, at the pages 269 to 272. The specialist also notes that, in FIG. 7, all transistors, all current sources and the resistor contribute to the function of the transmitting circuit and to the function of the balancing circuit. Consequently, the decision of splitting up these components into components belonging only to the transmitting circuit and components belonging only to the balancing circuit was arbitrary. In the case of FIG. 7, we could also have considered that the balancing circuit has parts in common with the transmitting circuit.

Finally, we note that, if we assume that enhancement MOSFETs are used to build the circuits shown in FIG. 7, the above-mentioned suitable biasing of the signal terminals (101) and of the common terminal (100) requires that the bias voltage between the common terminal (100) and ground exceeds about twice the threshold voltage of the MOSFETs, if we assume that the current sources (515) supplying a practically constant current I may operate with an output voltage greater than the threshold voltage of the MOSFETs. Consequently, the circuits shown in FIG. 7 are not suitable for the use shown in FIG. 4.

Fifth Embodiment

Figure 8:
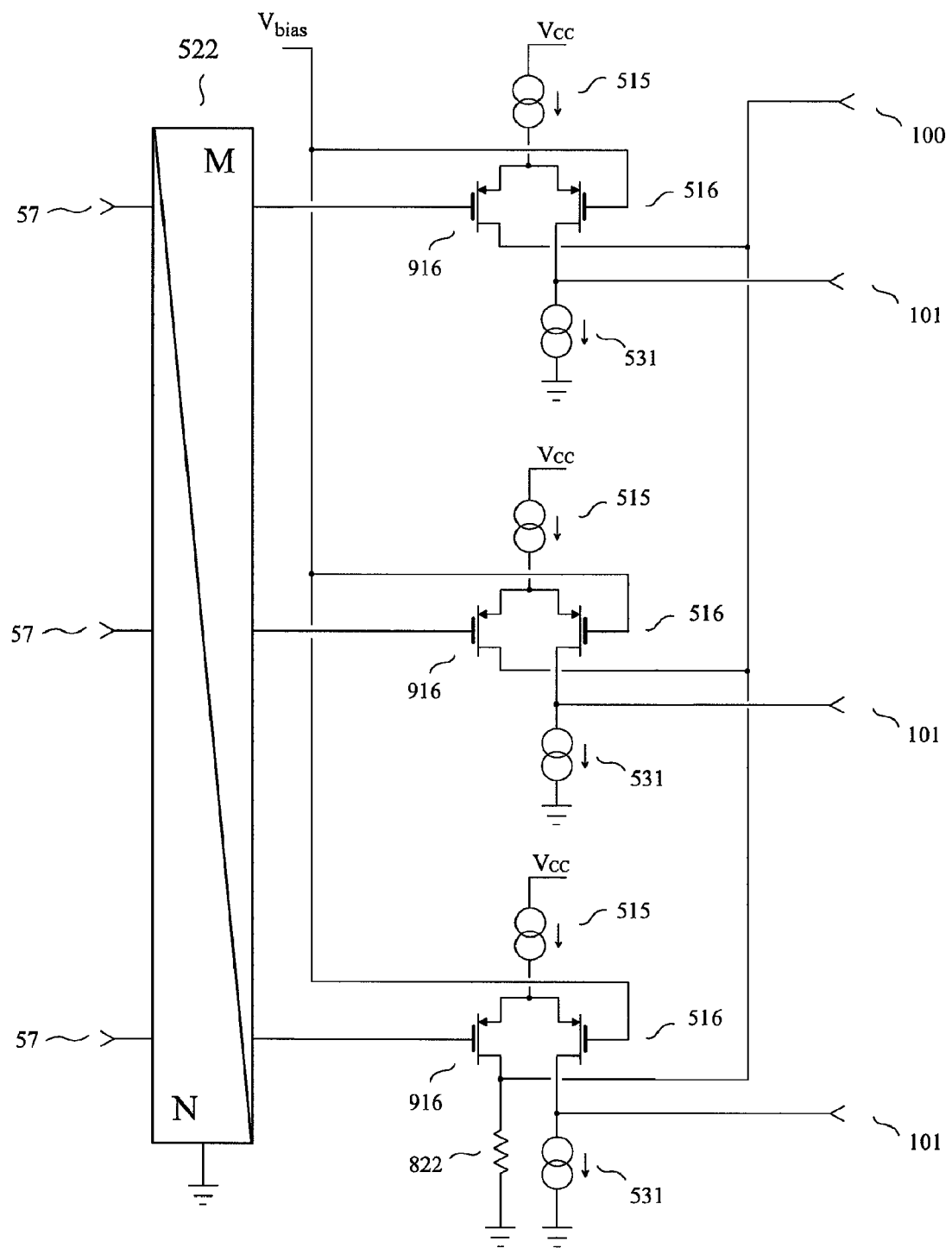
FIG. 8 shows a transmitting circuit and a balancing circuit used in a fifth embodiment of the invention.

A fifth embodiment of an interfacing device of the invention, given by way of non-limiting example, comprises the transmitting circuit and the balancing circuit shown in FIG. 8, in which:
   each of the q=3 "input signals of the transmitting circuit" is applied to an input (57) which is of the single-ended input type;
   each of the q=3 inputs (57) is connected to an input of a multiple-input and multiple-output amplifier (522) having q inputs and m outputs;
   each of the m=3 outputs of said multiple-input and multiple-output amplifier (522) corresponds to an input of a differential pair made of two p-channel transistors (516) (916) whose sources are biased by a current source (515) supplying a practically constant current I;
   each of the m=3 signal terminals (101) is connected to the drain of the first transistor (516) of one of said differential pairs and to a current source (531) supplying a current approximating I/2 and practically constant;
   the common terminal (100) is connected to the drains of the m second transistors (916) of said differential pairs and to a resistor (822) connected to ground.

As in FIG. 7, the current sources (515) (531) shown in FIG. 8 are ideal circuit elements which may be realized with real components, for instance using current mirrors, and it is easy to realize a circuit controlling the parameter I determining the current delivered by the current sources (515) (531).

Each output signal of the multiple-input and multiple-output amplifier (522) is a voltage approximately equal to a linear combination of said "input signals of the transmitting circuit", at least one of said linear combinations being such that two or more of the coefficients of said at least one of said linear combinations are not equal to zero. For instance, said multiple-input and multiple-output amplifier (522) may comprise a multiple-input and multiple-output amplifier described in said French patent application number 06/00388 and said corresponding international application.

In FIG. 8, we may consider that the balancing circuit is made of the q second transistors (916) of said differential pairs and of the resistor (822) connected to ground, the transmitting circuit being composed of the other components shown in FIG. 8. Consequently, the specialist understands that:
a) the output of the transmitting circuit shown in FIG. 8 delivers, when the transmitting circuit is in the activated state, m=3 transmission variables, each transmission variable being a current flowing out of one of said signal terminals (101), each transmission variable being mainly determined by a linear combination of said "input signals of the transmitting circuit", at least one of said linear combinations being such that two or more of the coefficients of said at least one of said linear combinations are not equal to zero;
b) the balancing circuit shown in FIG. 8 is such that, when the transmitting circuit is in the activated state, the current $i_C$ flowing out of the common terminal (100) approximates the sum of three terms, the first term being a constant current $i_{C0}$, the second term being the opposite $-(i_1+i_2+i_3)$ of the sum of the currents, $i_1$, $i_2$ and $i_3$ flowing out of the signal terminals (101) and the third term being the current flowing out of a passive linear two-terminal circuit element subject to the voltage between the common terminal and a reference node.

More precisely, the specialist sees that, for a suitable biasing of the signal terminals (101) and of the common terminal (100), the circuits shown in FIG. 8 are such that the currents flowing out of the m signal terminals (101) and the common terminal (100) satisfy $$i_C = \frac{qI}{2} - \sum_{\alpha=1}^{m} i_\alpha - \frac{v_C}{R_D} \tag{5}$$

where $R_D$ is the resistance of the resistor (822). This equation is frequency-independent and is compatible with the equations (1) and (2), for $$i_{C0} \approx \frac{qI}{2} \tag{6}$$

and for $Y_D=1/R_D$.

It is possible to consider that the circuits shown in FIG. 8, like the circuits shown in FIG. 7, comprise an interfacing device described in said French patent application Ser. No. 07/04889 and the corresponding international application.

Finally, we note that, if we assume that enhancement MOSFETs are used to build the circuits shown in FIG. 8, the above-mentioned suitable biasing of the signal terminals (101) and of the common terminal (100) is compatible with the use shown in FIG. 4.

Sixth Embodiment

Figure 9:
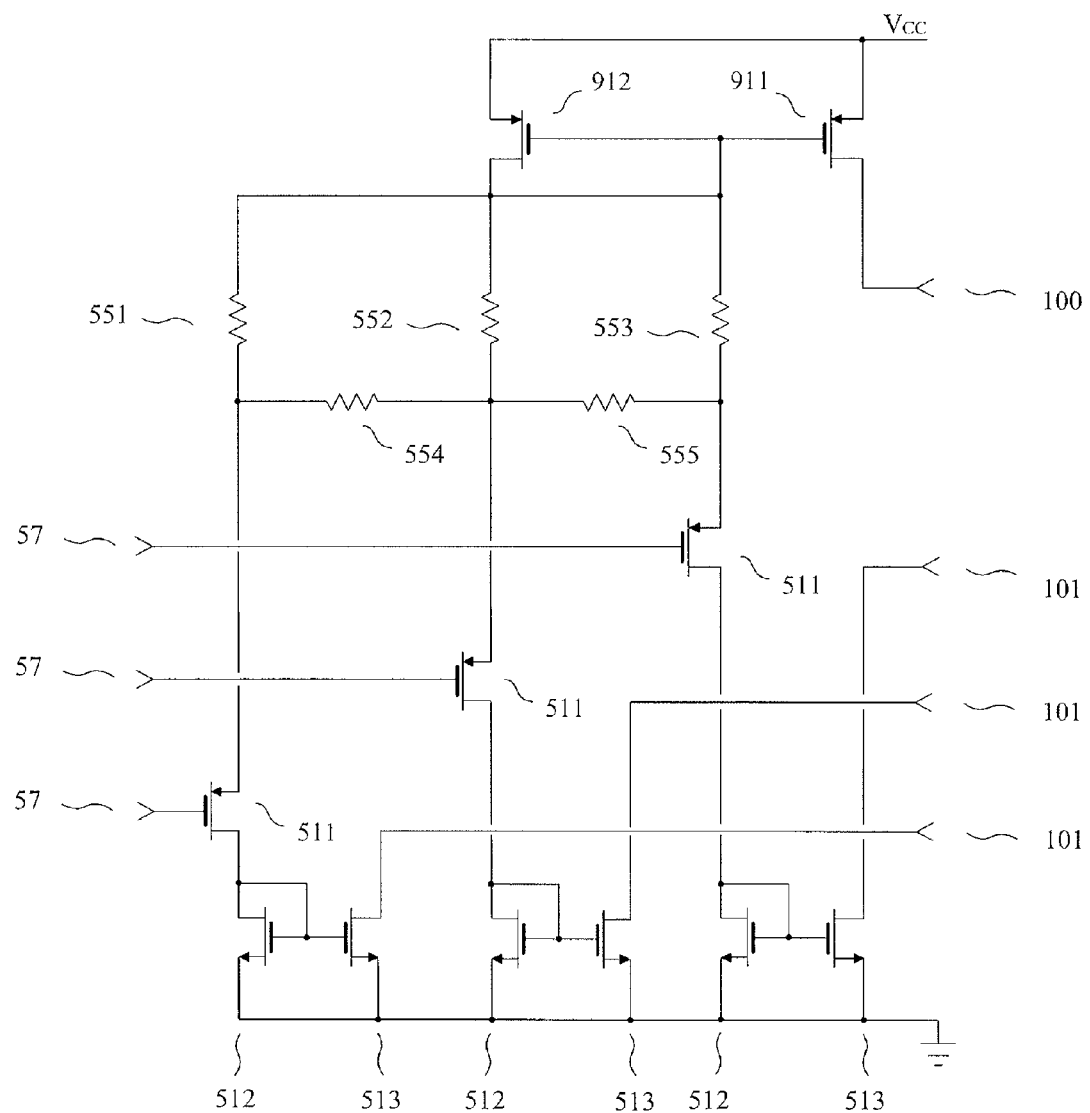
FIG. 9 shows a sixth embodiment of the invention.

A sixth embodiment of an interfacing device of the invention, given by way of non-limiting example, comprises the transmitting circuit and the balancing circuit shown in FIG. 9, in which:
- each of the q=3 "input signals of the transmitting circuit" is applied to an input (57) which is of the single-ended input type;
- each of the q=3 inputs (57) is coupled to the input of a three-transistor cell made of an input transistor (511) and of a current mirror comprising two transistors (512) (513);
- each of the m=3 signal terminals (101) is coupled to the drain of the output transistor (513) of the current mirror of one of said three-transistor cells;
- the source of the input transistor (511) of each three-transistor cell is connected to a feedback network consisting of five resistors (551) (552) (553) (554) (555);
- the transmitting circuit consists of the three three-transistor cells and of the feedback network, hence of 9 transistors (511) (512) (513) and 5 resistors (551) (552) (553) (554) (555);
- a current mirror connected to the power supply node (Vcc) comprises two transistors (911) (912);
- three resistors (551) (552) (553) of the feedback network have a common node connected to the input of said current mirror connected to the power supply node, the other resistors (554) (555) of the feedback network being referred to as "coupling resistors";
- the common terminal (100) is connected to the drain of the output transistor (911) of said current mirror connected to the power supply node;
- the balancing circuit is made of said current mirror connected to the power supply node, hence of two transistors (911) (912).

The transmitting circuit shown in FIG. 9 delivers, when the biasing of the inputs (57) is appropriate, transmission variables, each transmission variable being a current flowing out of one of the signal terminals (101), each transmission variable being approximately determined by a linear combination of said "input signals of the transmitting circuit", each of said linear combinations being such that two or more of the coefficients of said each of said linear combinations are not equal to zero because of the coupling introduced by said coupling resistors (554) (555) and by the input impedance of the current mirror connected to the power supply node. The specialist understands that applying a voltage near zero between each input (57) and the power supply node (Vcc) deactivates the transmitting circuit shown in FIG. 9, and that in this case its output presents a high impedance.

The specialist sees that the circuits shown in FIG. 9 may be proportioned such that, for a suitable biasing of the inputs (57), of the signal terminals (101) and of the common terminal (100), the current flowing out of the common terminal (100) approximates the opposite of the sum of the currents flowing out of the signal terminals (101), that is to say $$i_C \approx -\sum_{\alpha=1}^{m} i_\alpha \qquad (7)$$

This approximate equation is independent of frequency and is compatible with the equations (1) and (2), for $i_{C0}=0$ and for $Y_D=0$.

We note that, unlike the circuits shown in FIG. 7 and FIG. 8, it is not possible to consider that the circuits shown in FIG. 9 comprise an interfacing device described in said French patent application Ser. No. 07/04889 and the corresponding international application.

Seventh Embodiment

Figure 10:
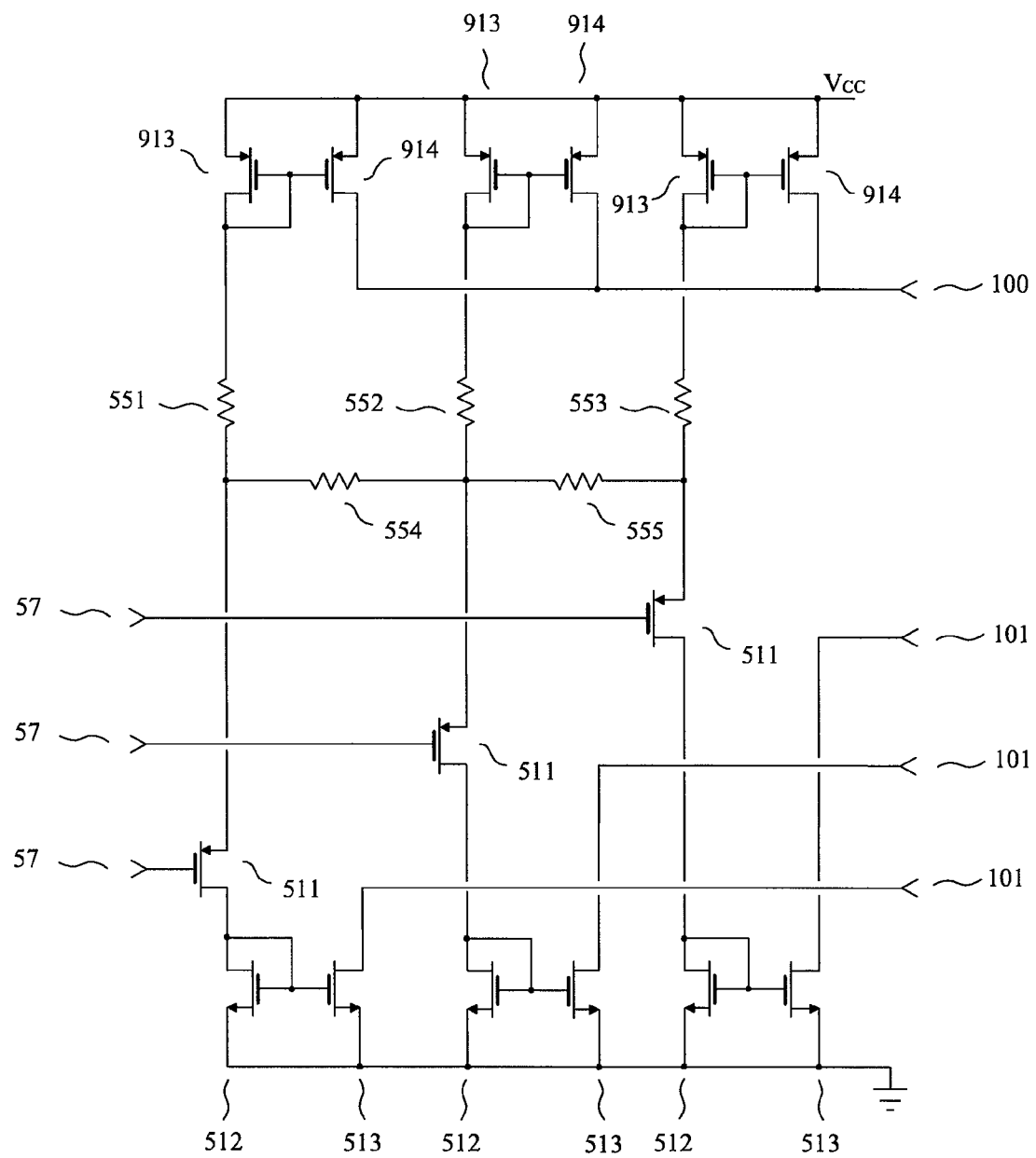
FIG. 10 shows a seventh embodiment of the invention.

A seventh embodiment of an interfacing device of the invention, given by way of non-limiting example, comprises the transmitting circuit and the balancing circuit shown in FIG. 10, in which:
- each of the q=3 "input signals of the transmitting circuit" is applied to an input (57) which is of the single-ended input type;
- each of the q=3 inputs (57) is coupled to the input of a three-transistor cell made of an input transistor (511) and of a current minor comprising two transistors (512) (513);
- each of the m=3 signal terminals (101) is coupled to the drain of the output transistor (513) of the current mirror of one of said three-transistor cells;
- the source of the input transistor (511) of each three-transistor cell is connected to a feedback network consisting of five resistors (551) (552) (553) (554) (555);
- the transmitting circuit consists of the three three-transistor cells and of the feedback network, hence of 9 transistors (511) (512) (513) and 5 resistors (551) (552) (553) (554) (555);
- three current mirrors connected to the power supply node (Vcc) each comprise two transistors (913) (914);
- three resistors (551) (552) (553) of the feedback network have a node connected to the input of one of said current mirrors connected to the power supply node, the other resistors (554) (555) of the feedback network being referred to as "coupling resistors";
- the common terminal (100) is connected to the drains of the output transistors (914) of said current mirrors connected to the power supply node;
- the balancing circuit is made of said current mirrors connected to the power supply node, hence of six transistors (913) (914).

The transmitting circuit shown in FIG. 10 delivers, when the biasing of the inputs (57) is appropriate, transmission variables, each transmission variable being a current flowing out of one of the signal terminals (101), each transmission variable being approximately determined by a linear combination of said "input signals of the transmitting circuit", each of said linear combinations being such that two or more of the coefficients of said each of said linear combinations are not equal to zero because of the coupling introduced by said coupling resistors (554) (555). The specialist understands that applying a voltage near zero between each input (57) and the power supply node (Vcc) deactivates the transmitting circuit shown in FIG. 10, and that in this case its output presents a high impedance.

The specialist sees that the circuits shown in FIG. 10 may be proportioned such that, for a suitable biasing of the inputs (57), of the signal terminals (101) and of the common terminal (100), the equation (7) is applicable. We note that, unlike the circuits shown in FIG. 7 and FIG. 8, it is not possible to consider that the circuits shown in FIG. 10 comprises an interfacing device described in said French patent application Ser. No. 07/04889 and the corresponding international application.

The specialist understands that, in the sixth and seventh embodiments:
a) the feedback network may be replaced with a different feedback network providing a suitable coupling between the channels;
b) the input transistor (511) of each three-transistor cell may be replaced with any suitable active sub-circuits, for instance one of the active sub-circuits used in said French patent application number 06/00388 and the corresponding international application;
c) all current mirrors may be replaced with other suitable current mirrors.

INDICATIONS ON INDUSTRIAL APPLICATIONS

The interfacing device of the invention is suitable for transmission between integrated circuits through an interconnection having two or more transmission conductors, the transmission presenting reduced unwanted couplings. An interfacing device of the invention can take the place of a transmitting circuit used in one of the devices described in said French patents number 0300064, number 0302814 and number 0303087, and the corresponding international applications, and thereby provide a reduction of external crosstalk. This is for instance shown in the discussion of the use shown in FIG. 4. However, we note that the interfacing device of the invention is not compatible with any known pseudo-differential transmission scheme, since neither prior art nor this application contain the description of a pseudo-differential transmission scheme which can use a transmitting circuit receiving "input signals of the transmitting circuit" and delivering transmission variables mainly determined by said "input signals of the transmitting circuit", one or more of said transmission variables being not mainly determined by only one of said "input signals of the transmitting circuit". For instance, we note that the use shown in FIG. 4 does not correspond to a pseudo-differential transmission scheme in the meaning of said French patent application Ser. No. 07/05260 and the corresponding international application, because it uses an interconnection comprising neither a common conductor nor a return conductor distinct from the reference conductor.

Consequently, the interfacing device of the invention is very different from the invention described in said French patent application Ser. No. 07/04889 and the corresponding international application, which is intended to be used in a pseudo-differential transmission scheme but which cannot take the place of a transmitting circuit used in one of the devices described in said French patents number 0300064, number 0302814 and number 0303087 and the corresponding international applications.

We note that, in the embodiments of an interfacing device of the invention, given above by way of non-limiting examples and shown in FIGS. 7, 8, 9 and 10, the active components are MOSFETs. This is not at all a characteristic of the invention, and specialists understand that it would have also been possible to use bipolar transistors or other types of active components. Consequently, the interfacing device of the invention may be implemented in integrated circuits made using any applicable manufacturing process.

The invention is suitable for the protection against the noise produced by unwanted electromagnetic couplings in printed circuit boards. The invention is particularly beneficial to printed circuit boards comprising wide-band analog circuits or fast digital circuits.

The interfacing device of the invention is particularly suitable for transmission inside an integrated circuit, because it provides a good protection against the noise related to the currents flowing in the reference conductor and in the substrate of the integrated circuit.

The invention is suitable for an implementation in a data bus architecture.

The invention is particularly suitable for multilevel signaling, because this type of transmission scheme is more sensitive to noise than binary signaling.

The invention, in particular when the transmission variables used by said transmitting circuit are currents, is particularly suitable for simultaneous bi-directional signaling, because this type of transmission scheme is more sensitive to noise than unidirectional signaling.

The invention claimed is:

1. A device for transmitting signals through a plurality of transmission channels, in a known frequency band, comprising:
    m signal terminals, a common terminal and a reference terminal, the signal terminals being intended to be connected to an interconnection having m transmission conductors, m being an integer greater than or equal to 2;
    a transmitting circuit receiving q input signals of the transmitting circuit corresponding each to a transmission channel, q being an integer greater than or equal to 2 and less than or equal to m, the output of the transmitting circuit being coupled to each of the signal terminals, the output of the transmitting circuit delivering, when the transmitting circuit is in the activated state, m transmission variables, each of the transmission variables being either a voltage between one of the signal terminals and the common terminal or a current flowing out of one of the signal terminals, each of the transmission variables being mainly determined by one or more of the input signals of the transmitting circuit, one or more of the transmission variables being not mainly determined by only one of the input signals of the transmitting circuit; and
    a balancing circuit delivering, when the transmitting circuit is in the activated state, a current into the common terminal, the total current flowing out of the common terminal being, when the transmitting circuit is in the activated state, in at least a part of the known frequency band, approximately equal to a sum of three terms, the first term being a constant current, the second term being the opposite of the sum of the currents flowing out of the signal terminals, and the third term being the current flowing out of a passive two-terminal circuit element subject to the voltage between the common terminal and the reference terminal.

2. The device for transmitting signals of claim 1, wherein each of the transmission variables delivered by the transmitting circuit is mainly determined by a linear combination of the input signals of the transmitting circuit, at least one of the linear combinations being such that two or more of the coefficients of said at least one of the linear combinations are not equal to zero.

3. The device for transmitting signals of claim 2, wherein one or more of the coefficients of the linear combinations can be adjusted by electrical means.

4. The device for transmitting signals of claim 1, wherein the total current flowing out of the common terminal approximates, when the transmitting circuit is in the activated state, in at least a part of the known frequency band, a sum of three terms, the first term being a constant current, the second term being the opposite of the sum of the currents flowing out of the signal terminals, and the third term being the current flowing out of a passive linear two-terminal circuit element subject to the voltage between the common terminal and the reference terminal.

5. The device for transmitting signals of claim 4, wherein the balancing circuit is such that the admittance of the passive linear two-terminal circuit element subject to the voltage between the common terminal and the reference terminal can be adjusted by electrical means.

6. The device for transmitting signals of claim 1, wherein the balancing circuit has at least one part in common with the transmitting circuit.

7. The device for transmitting signals of claim 1, further comprising a receiving circuit delivering, when the receiving circuit is in the activated state, p output signals of the receiving circuit corresponding each to a transmission channel, p being an integer greater than or equal to 1 and less than or equal to m, the input of the receiving circuit being coupled to at least p of the signal terminals and to the common terminal, each of the output signals of the receiving circuit being mainly determined by one or more of the voltages between one of the signal terminals and the common terminal.

8. The device for transmitting signals of claim 1, further comprising a termination circuit coupled to each of the signal terminals and to the common terminal, the termination circuit being, when the termination circuit is in the activated state, approximately equivalent, for the signal terminals and the common terminal, to a (m+1)-terminal network such that, at least one quiescent operating point, for small signals in said part of the known frequency band, the impedance matrix, with respect to the common terminal, of the (m+1)-terminal network is equal to a wanted non-diagonal matrix of size m×m.

9. The device for transmitting signals of claim 1, wherein said device for transmitting signals constitutes a part of an integrated circuit, the interconnection being realized inside the integrated circuit.

10. The device for transmitting signals of claim 1, wherein said device for transmitting signals constitutes a part of an integrated circuit, each of the m signal terminals being coupled to one or more pins of the integrated circuit, the common terminal being coupled to one or more pins of the integrated circuit.

* * * * *